United States Patent

Sakai

[15] 3,702,992

[45] Nov. 14, 1972

[54] LARGE CAPACITY FERROMAGNETIC THIN FILM MEMORY DEVICE

[72] Inventor: Masaaki Sakai, Yokohama, Japan

[73] Assignee: Fujitsu Limited, Kawasaki, Japan

[22] Filed: May 20, 1970

[21] Appl. No.: 39,166

Related U.S. Application Data

[63] Continuation-in-part of Ser. No. 586,167, Oct. 12, 1966, abandoned.

[30] Foreign Application Priority Data

Oct. 14, 1965 Japan ......................40/63108

[52] U.S. Cl........................340/174 TF, 340/174 DA, 340/174 LA, 340/174 M, 340/174 PW, 340/174 WA

[51] Int. Cl. ............................................G11c 11/14

[58] Field of Search....340/174 PW, 174 TF, 174 DA

[56] References Cited

UNITED STATES PATENTS

| | | | |
|---|---|---|---|
| 3,422,410 | 1/1969 | Bartik | 340/174 PW |
| 3,070,783 | 12/1962 | Pohm | 340/174 TF |
| 3,293,626 | 12/1966 | Thome | 340/174 DA |
| 3,304,543 | 2/1967 | Louis et al. | 340/174 TF |

*Primary Examiner*—James W. Moffitt
*Attorney*—Curt M. Avery, Arthur E. Wilfond, Herbert L. Lerner and Daniel J. Tick

[57] ABSTRACT

Driving currents supplied to the current driving conductors in the hard magnetization direction axis and the easy magnetization direction axis of a thin film magnetic memory device are selected to prevent inversion of the magnetization when driving current is supplied to only one of the conductors and to permit inversion of the magnetization only when driving current is supplied simultaneously to both conductors. Readout is provided when driving current is simultaneously supplied to both conductors and writein is provided when driving current is supplied to one of the conductors independent of the writein information and driving current is supplied to the other of the conductors dependent upon writein information.

5 Claims, 17 Drawing Figures

LARGE CAPACITY FERROMAGNETIC THIN FILM MEMORY DEVICE

DESCRIPTION OF THE INVENTION

The present invention is a Continuation-in-part application of patent application Ser. No. 586,167, filed Oct. 12, 1966, and now abandoned, for Large Capacity Ferromagnetic Thin Memory Device, and assigned to the same assignee.

The present invention relates to a thin film memory device. More particularly, the invention relates to a ferromagnetic thin film memory device.

Ferromagnetic thin films are utilized as memory elements in high speed electronic computers, since they considerably shorten readin and readout time. The time necessary to change a stored information is called the switching time. If thin films are utilized, the switching time may be reduced to less than $10^{-8}$ second.

A memory element of the type referred to may have the configuration of a flat plate. A memory element comprises an electrically conducting wire coated by electroplating or other suitable method with a thin film of a soft magnetic alloy such as, for example, non-magnetostrictive permalloy, which is a nickel-iron alloy in which the ratio of nickel to iron is about 80 to 20. The memory element is thus a coated or plated wire. The coated wire memory element or memory wire has the characteristics of uniaxial magnetic anisotropy; that is, the magnetic properties thereof depend upon direction. The material tends to magnetize along determined crystallographic axes, called directions of easy magnetization. The direction of easy magnetization of the magnetic anisotropy is in the thin film of the memory wire. When no external magnetic field is applied, the residual magentization tends to align parallel or nonparallel with the direction of easy magnetization. The direction of easy magnetization may be made a circumferential direction of the memory wire at the time that said wire is electroplated.

The memory wire may indicate either of two conditions such as, for example, binary "0" and binary "1," depending upon the orientation of the direction of easy magnetization. A magnetic field may be applied in the direction of hard magnetization at right angles to the direction of easy magnetization to vary the magnetization and read out the condition of the variation as binary "0" or binary "1." Binary "0" or binary "1" may be read in by providing an inversion of the magnetization only when a suitable magnetic field is applied in both the direction of easy magnetization and the direction of hard magnetization and preventing an inversion of the magnetization when a magnetic field is applied in only one of said directions.

As described above, in the conventional thin film memory device, the readout is performed by causing inversion of magnetization by applying a relatively large magnetic field only in the direction of the magnetization hard direction axis, which is at right angles with the magnetization easy direction axis. Namely, in all of the conventional memory devices utilizing thin films as the memory elements, the readout is performed by inverting all the magnetizations by applying a relatively large magnetic field only in the direction of the magnetization hard direction axis in order to make the most of the highspeed property of the thin films. This method is generally referred to as the word selection method. It is also referred to as the two dimensional method.

On the other hand, the write in of "1" to "0" or "0" to "1" is performed in the thin film memory device by utilizing the inversion of magnetization caused by applying the magnetic field in both of the direction of magnetization easy direction axis and the direction of magnetization hard direction axis which is at right angles with the former axis. This method is generally referred to as the current coincidence method. It is also referred to as the bit selection method or the three dimensional method.

If this latter write in method is also applied to the readout, the memory speed is sacrificed, but the cost of the memory device is considerably reduced. This is because only the positions at which the electric currents flow to the wires in the two directions which coincide with each other are affected by the inversion of the magnetic field and the other positions are not affected at all. In other words, the peripheral circuit, that is, the decoder for selecting the two wires, is not required to be on as large a scale as the peripheral circuit for selecting a single wire. The conventional method in which one point is not determined by the coincidence of the electric currents flowing to two wires will require one more decoder. It has recently become greatly desirable to increase the capacity of the memory device and accordingly it is greatly preferred to reduce the cost of the memory device. However, the best possible efforts should be made to prevent a considerable reduction in speed in order to reduce the cost.

A memory device of a large capacity utilizing the toroidal type magnetic cores has hitherto been developed but the speed of this type of memory device is extremely low, since the switching speed of the toroidal type magnetic core element itself is low.

If a memory device is manufactured by the use of the thin film elements, a high speed is available. In this case, if the device is manufactured by the method of utilizing the coincidence of the electric currents flowing to the wires in the two directions as hereinbefore described, the reduction of the cost can also be achieved at the same time.

It is possible to manufacture a large capacity memory device which is less expensive and operates at higher speed than the toroidal core, by the use of the woven type plated rod memories or coated wire memories which have excellent characteristics and which have recently become available inexpensively in the market in Japan and other countries.

In view of the foregoing points, the first object of this invention is to offer a novel ferromagnetic thin film memory device suited for a large capacity memory device.

Another object of the invention is to offer a novel memory circuit and a peripheral device such as a decode circuit for manufacturing a memory device of a large capacity inexpensively.

Another object of the invention is to offer a thin film memory device utilizing a novel readout method.

Another object of the invention is to offer an inexpensive peripheral device suited for readout.

Another object of the invention is to offer such a novel method of supplying electric current to the thin film element that the inversion is never caused only by the magnetic field produced by the electric current supplied to one drive line.

Another object of the invention is to offer a novel drive circuit of the readout and writein.

Another object of the invention is to offer a driving current erasing means for detecting only the output signal from only one of the driving conductors.

Another object of the invention is to offer a novel readout amplifying circuit and a detecting circuit wherein even if the same level mode signal is given, the output is detected only when the signal of the level of the difference detected is given.

Another object of the invention is to offer a novel means for detecting with accuracy only the readout current from the current comprising the combined drive current and readout current.

In the memory device of this invention, driving conductors are provided in parallel with the magnetization easy direction axis and the magnetization hard direction axis of the elements. The amplitudes and the time durations of the electric currents supplied to or flowing in the driving conductors are so selected that the magnetization may not be inverted or demagnetized by only either one of said electric currents and the magnetization may be inverted or demagnetized only when the two electric currents are applied coincidentally.

The readout is performed by detecting the direction of said inversion and the writein is performed by the coincidence of one driving current which flows irrespective of the writing in information and the other drive current controlled by the writing in information.

Either one of the direction of the magnetization easy direction axis (X) and the direction of the magnetization hard direction axis (Y) may be controlled by the writing in information. However, the readout must be the side controlled by the writing in information. This is because the side controlled by the writing in information is in the direction of the bit and the readout must be in parallel with the bit.

In brief, a feature of the readout method of the present invention is the addition of means for erasing the driving current and detecting only the output signal from the element with respect to the digit conductor in the transverse direction of the side controlled by the writing in information.

In order that the invention may be readily carried into effect, it will now be described with reference to the accompanying drawings, wherein:

FIG. 1 is an asteroid curve $HL^{2/3} + HT^{2/3} = HK^{2/3}$ which shows the principle of the switching operation of a thin film magnetic memory element. The memory element may comprise a soft magnetic alloy such as, for example, non-magnetostrictive permalloy, which is a nickel-iron alloy in which the ratio of nickel to iron is about 80 to 20 and which has the configuration of a flat plate or a plated rod;

FIG. 2*a* illustrates an element having the configuration of a flat plate;

FIG. 2*b* illustrates an element having the configuration of an electrically conducting wire coated by electroplating;

Figure 8A:
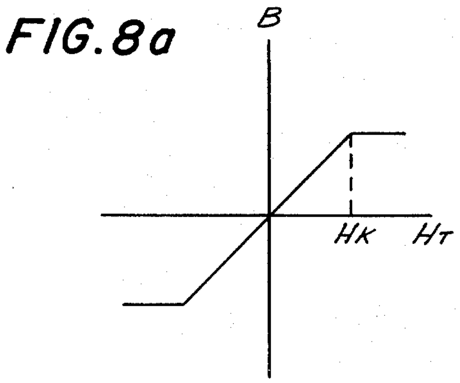
Figure 8B:
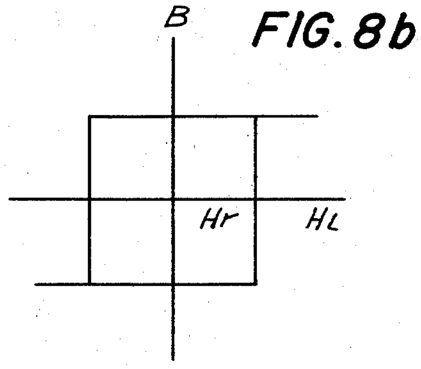

FIGS. 8*a* and 8*b* are graphical presentations of the B–H systeresis curves of the hard axis direction and the easy axis direction of the ferromagnetic thin film; and FIGS. 9 to 15 illustrate an embodiment of the device of the invention. This embodiment utilizes the sensing system of FIG. 6 and the method of increasing the capacity by the principle of the readout method curve *b* of FIG. 3.

Figure 9:
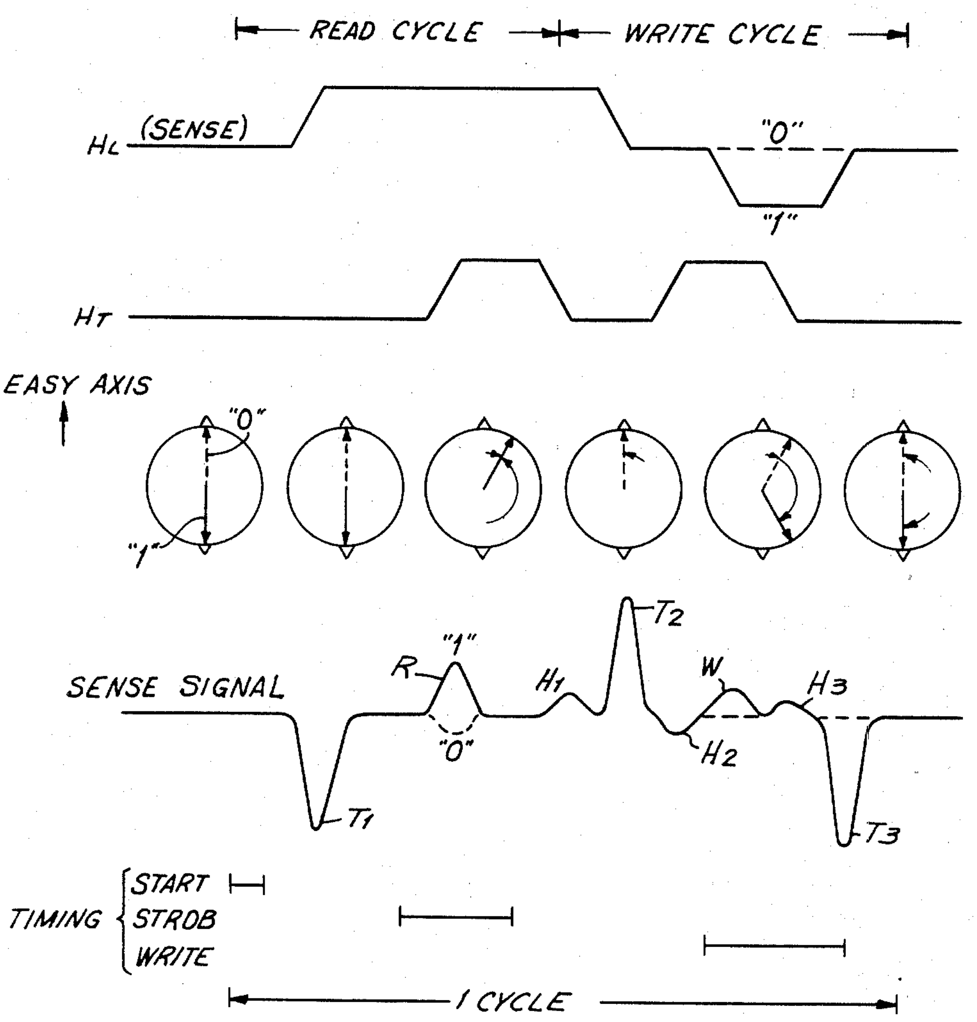
Figure 10:
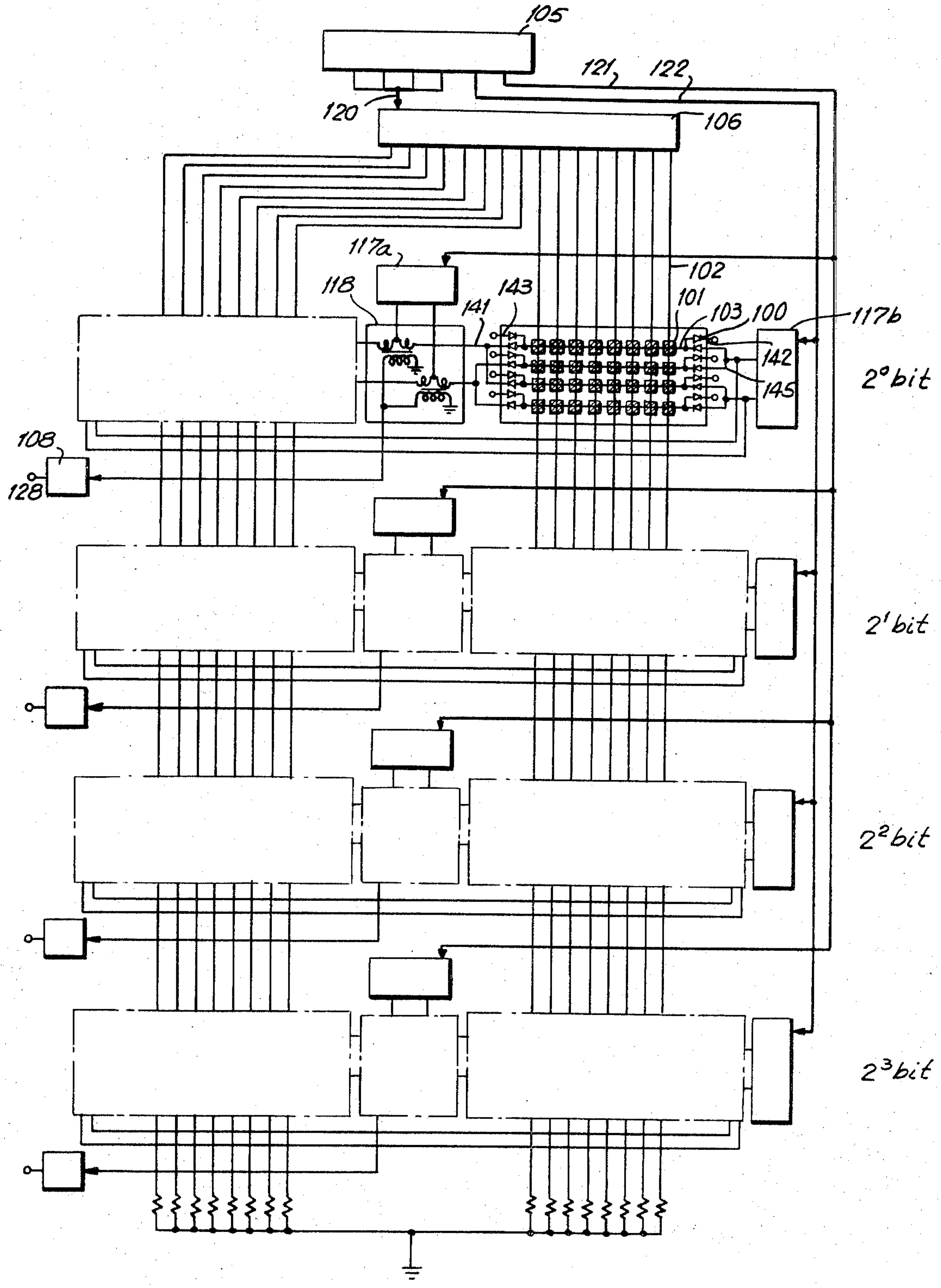
Figure 11:
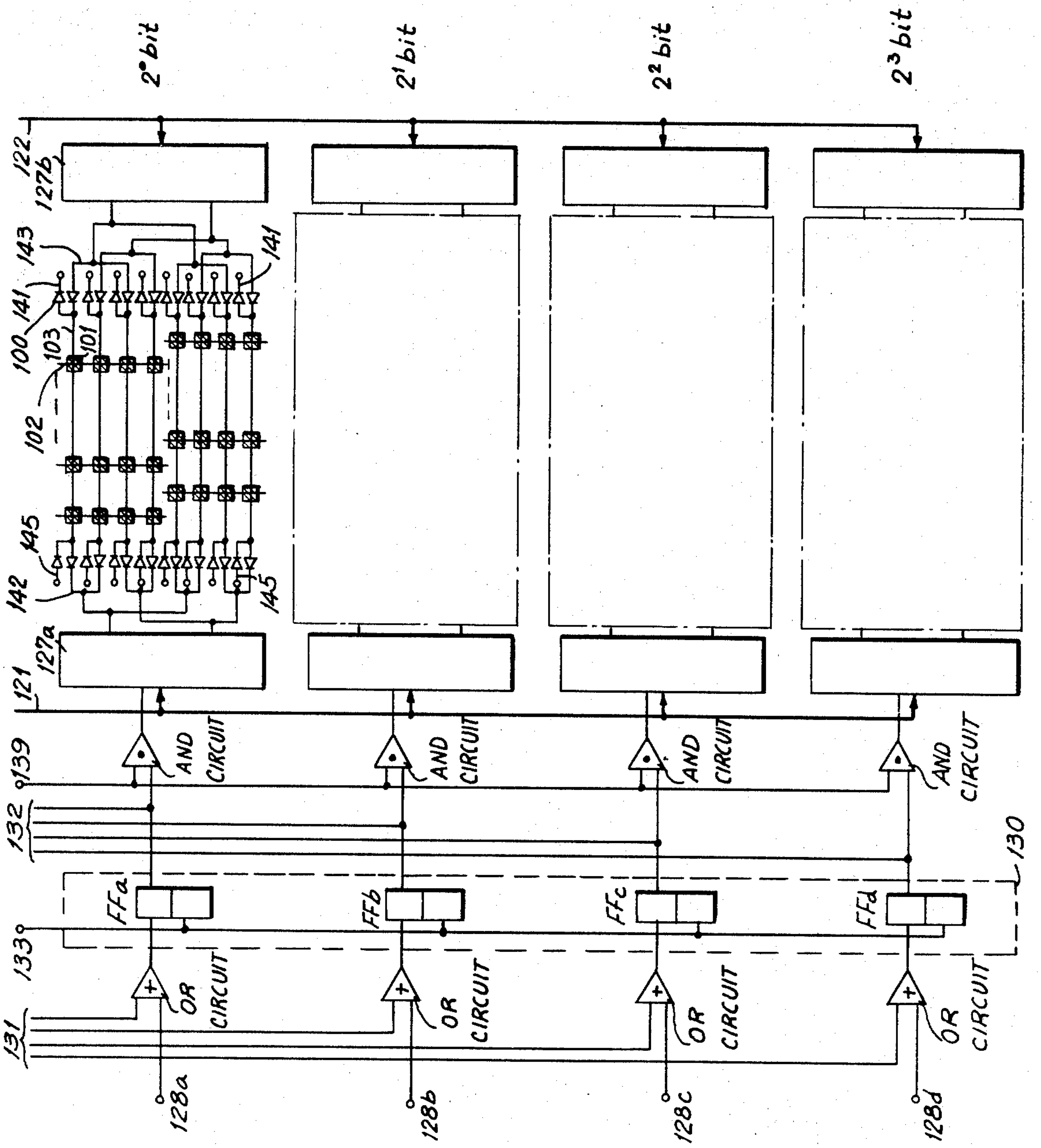
Figure 12:
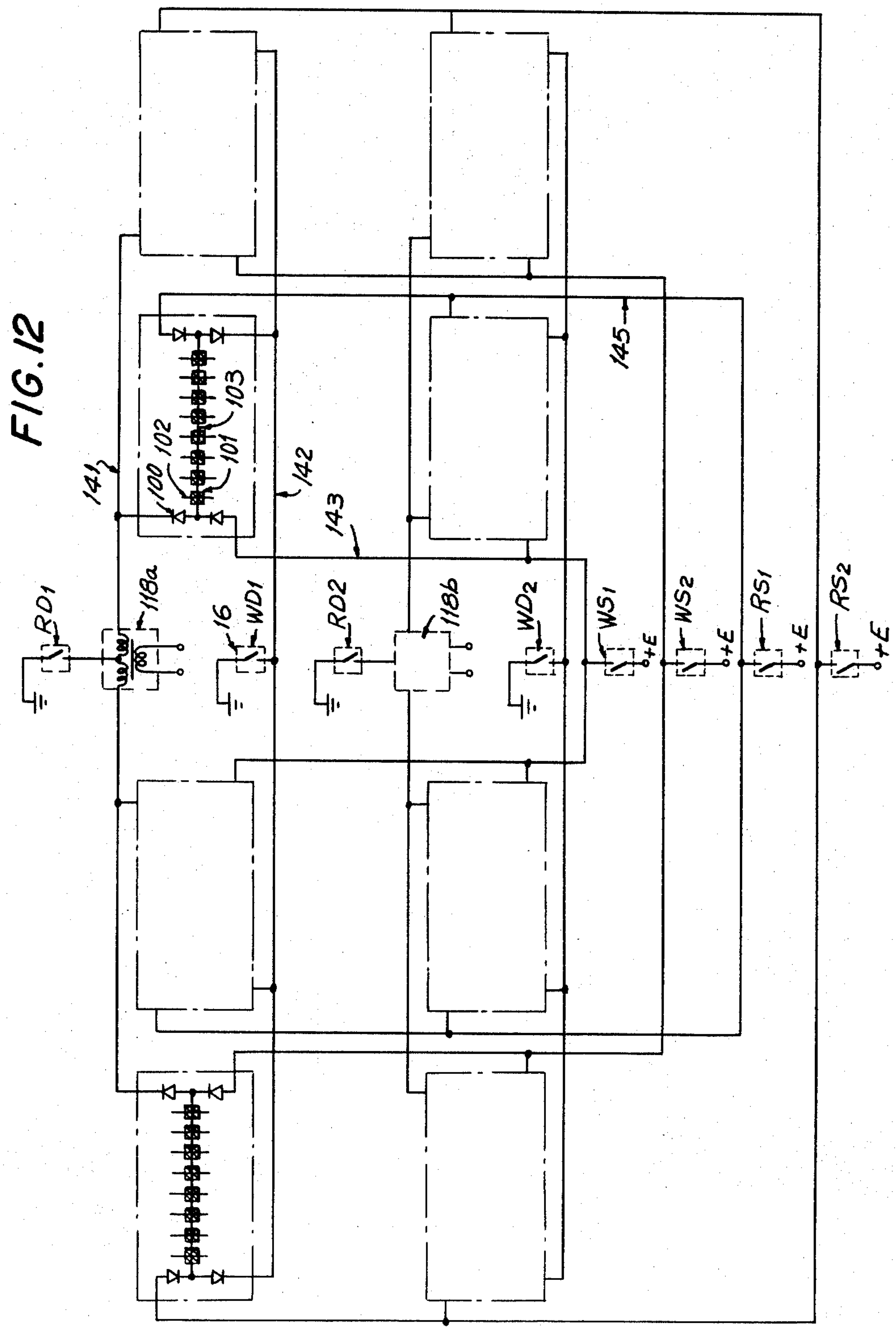
Figure 13:
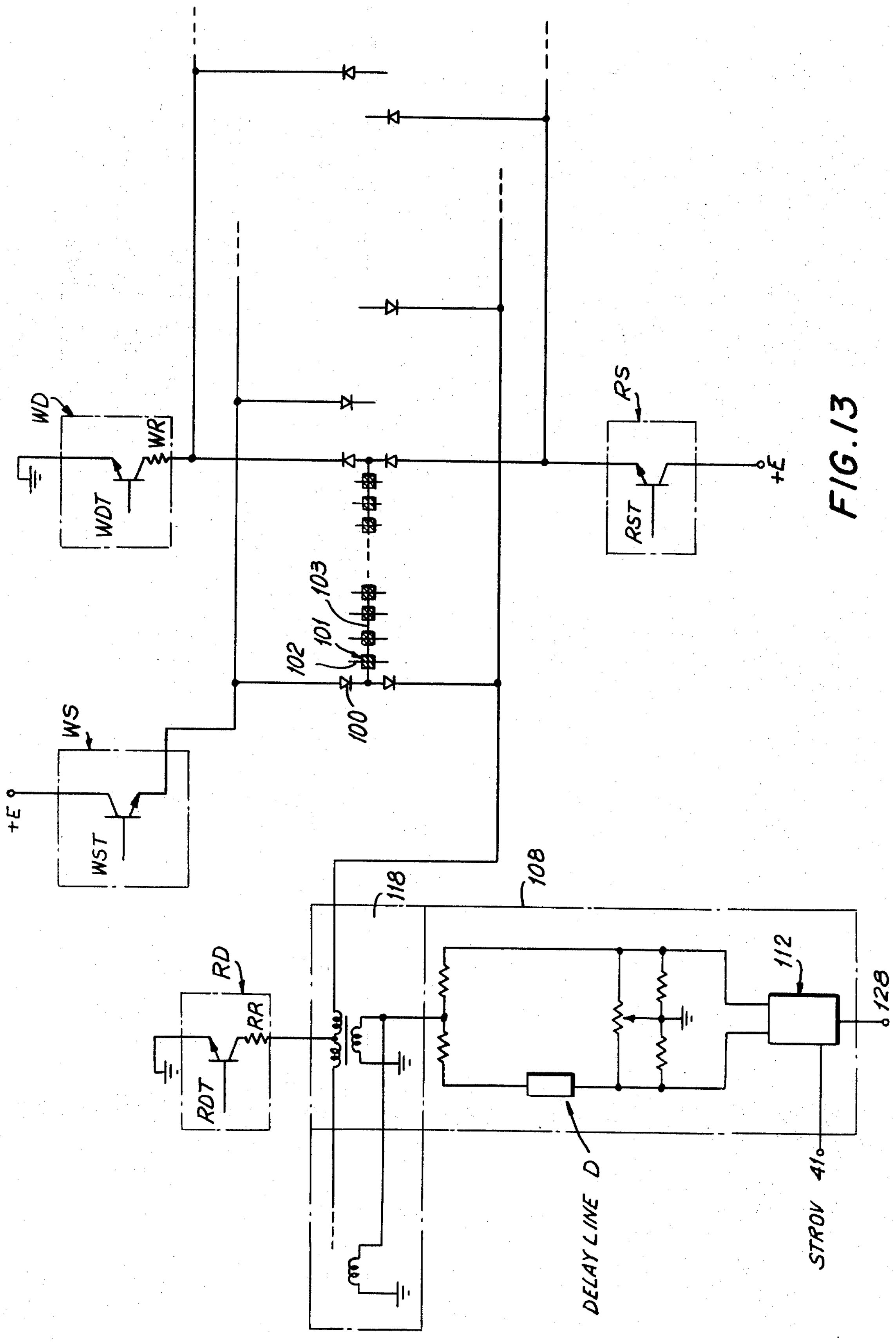
Figure 14:
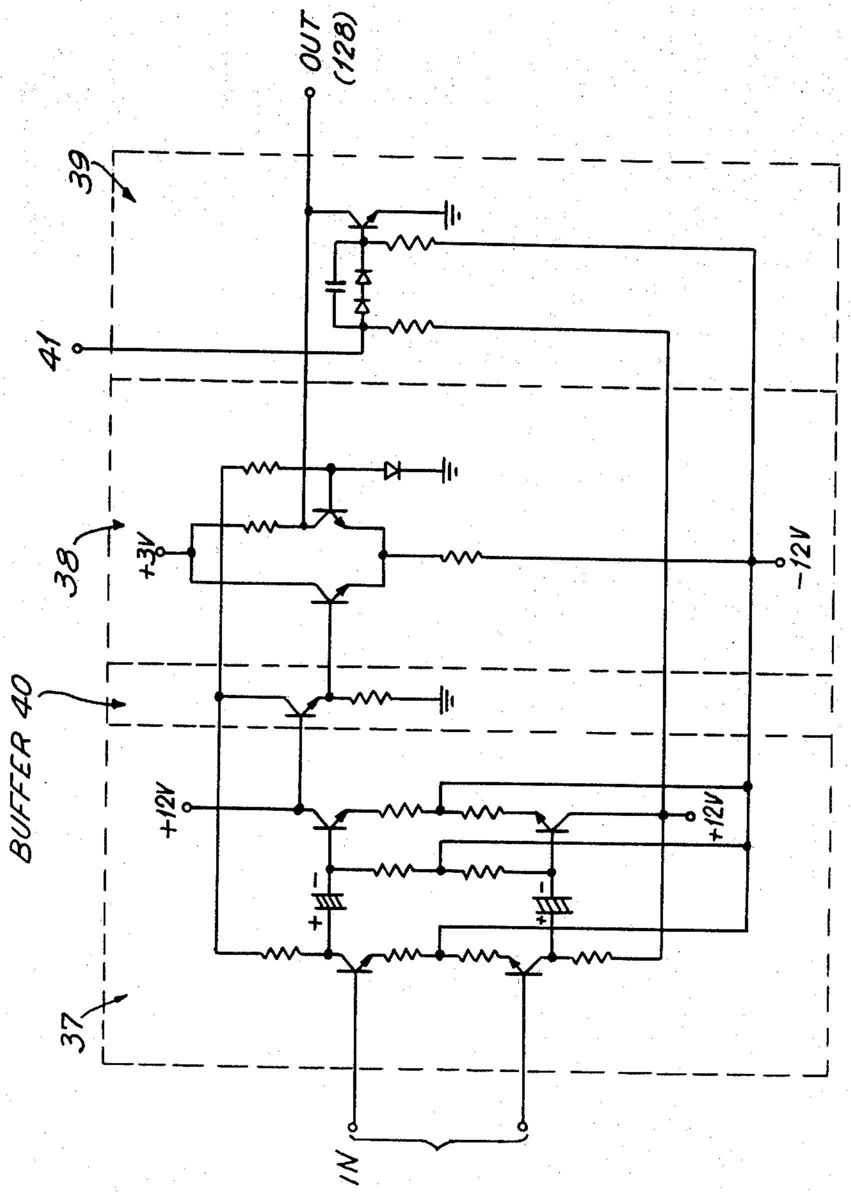
Figure 15:
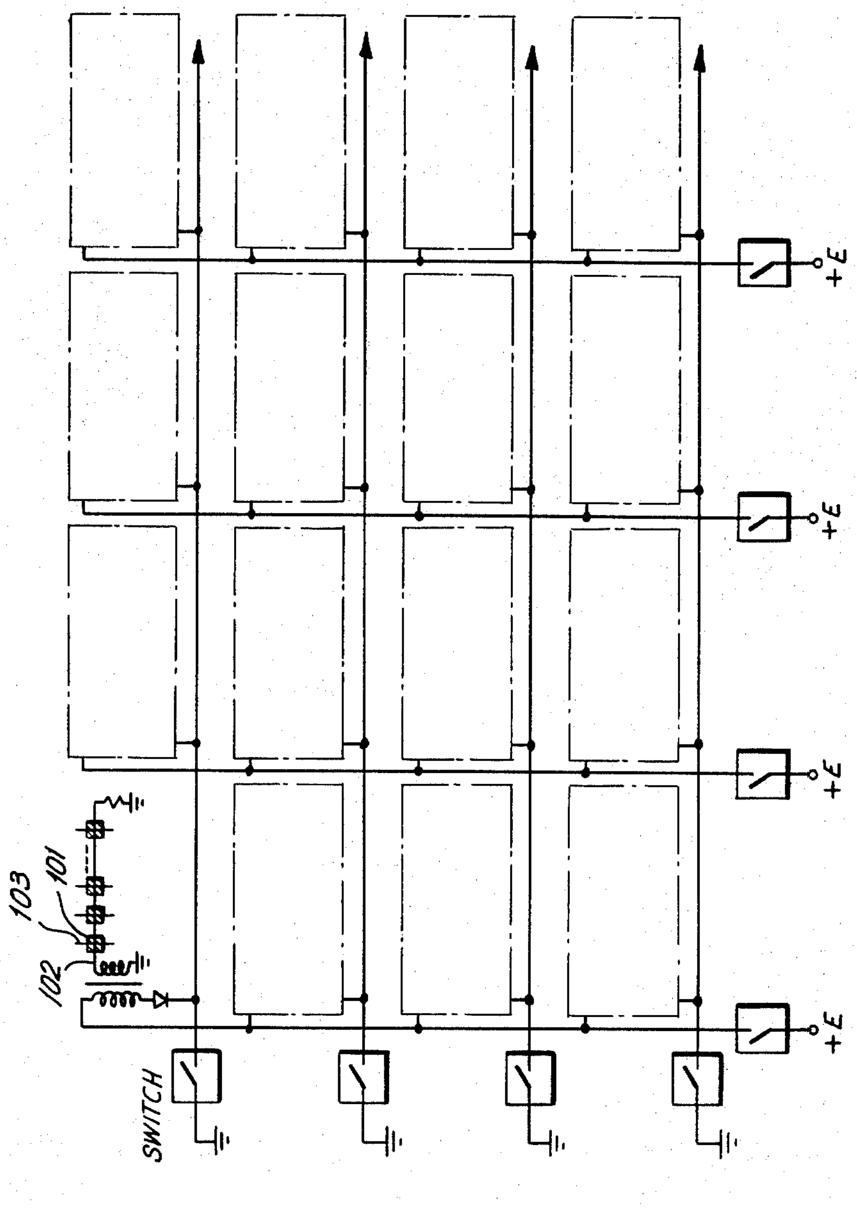

Of the last seven FIGS., FIG. 9 shows the driving waveforms of the device of the invention and the process of obtaining the sensing output waveform by said driving waveforms;

FIG. 10 is a block diagram showing the entire circuit constitution of the device of the invention;

FIG. 11 is a block diagram illustrating the part of the device of the invention not shown in FIG. 10;

FIG. 12 is a block diagram illustrating the state of the read and write drive of the address drive line in the direction of bit which is also referred to as the direction of line or the Y direction, of the device of the invention;

FIG. 13 shows the connection of the read and write circuit of the address drive line in the direction of bit of the device of the invention in partially more detail than FIG. 12;

FIG. 14 is a circuit diagram of the output signal detecting circuit of the device of the invention; and FIG. 15 shows the connection of the drive circuit of the address drive line in the direction of a column or X direction of the device of the invention.

First of all, the principle of operation of the thin film memory element will be explained.

As is well known, a ferromagnetic thin film has the property that the residual magnetization exists within the thin film at the time of the manufacture of the film and said residual magnetization tends to align parallel or non-parallel with one direction when the external magnetic field does not exist. This property is referred to as the uniaxial magnetic anisotropy. The direction in which the residual magnetization aligns is referred to as the magnetization easy direction axis. Furthermore, the direction at right angles with the direction in which the residual magantization aligns is referred to as the magnetization hard direction axis.

Figures 1, 2A, 2B:
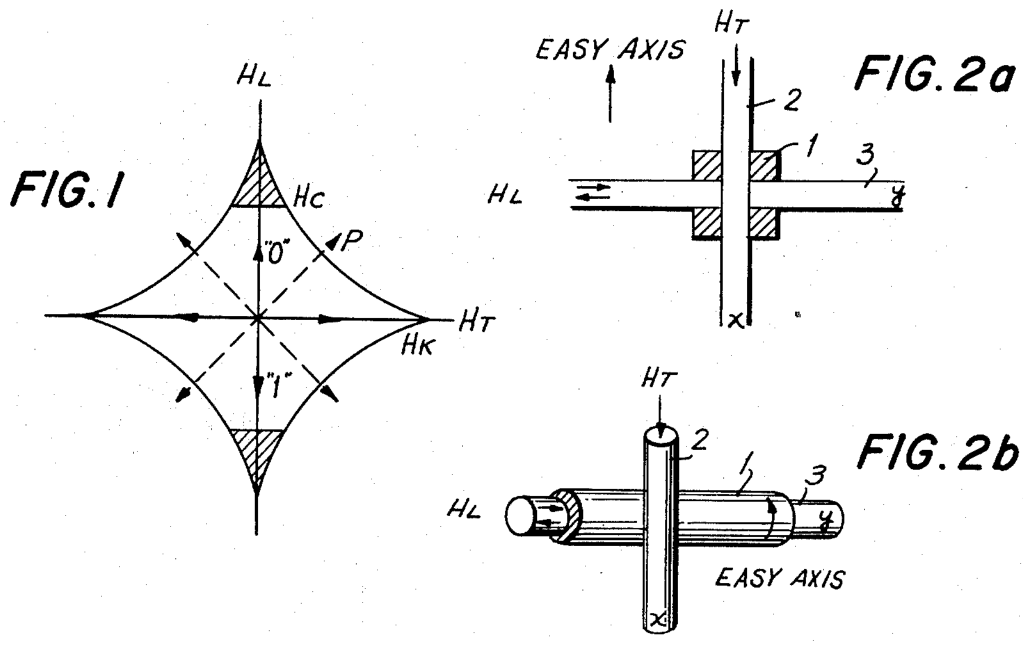

FIG. 1 is an asteroid curve which shows the property of the thin film. The method of readout and writein of the thin memory device is described with reference to the asteroid curve of FIG. 1. In FIG. 1, the HL axis indicates the easy direction and the axis indicates the hard direction. Two possible favorable directions exist depending upon the orientation of the magnetization easy direction axis, namely, it is possible to make binary information "0" and "1" correspond to the two directions. "1" and "0" in FIG. 1 indicate the two directions.

The readout of the binary informations "1" and "0" is performed by applying a magnetic field in the direction of the magnetization hard direction axis which is at right angles with the magnetization easy direction axis and moving the residual magnetization in the direction of said magnetic field. If the magnetic field is applied in the HK direction in FIG. 1, for example, the residual magnetizations of the magnetic field move in the right-handed and left-handed directions, that is, in the opposite direction to each other depending upon whether the binary information is "0" or "1." The binary information is determined or discriminated by detecting the direction of the electric current generated by the movement.

A ferromagnetic thin film having uniaxial anisotropy has the switching characteristic of being capable of determining the direction of magnetization of "1" and "0," as hereinbefore described, in any desired direction. The asteroid curve shown in FIG. 1 is so written that it may conveniently show the switching characteristic. This is due to the fact that such characteristic is the threshold value curve of switching, and is expressed by the following vector expression in an ideal element:

$$HL^{2/3}+HT^{2/3}=HK^{2/3}$$

HL is the magnetic field in the easy axis direction. HT is the magnetic field in the hard axis direction. HK is the anisotropic magnetic field.

If the composite magnetic field HK of HL and HT is within the asteroid curve, the magnetization of the element is not switched, and if HK is outside the curve, the magnetization of the element is switched. Now, if the composite magnetic field vector of HL and HT is P, for example, then, as evident from the asteroid curve shown in FIG. 1, either one of HL and HT is not sufficient, by itself, to cause the magnetization to be switched, and the magnetization is switched only when HL and HT are applied coincidentally.

The readout and writein are performed by utilizing the switching property hereinbefore described. That is, when it is desired to write in "0" from "1" or "1" from "0," HL and HT are applied coincidentally. Also, when it is desired to write in "0" or "1" without change, only either one of HL and HT is applied. Furthermore, only the position to which HL and HT are applied coincidentally is read out.

In the parts at the upper end and the lower end of the drawing along the easy axis, shown by oblique lines, the switching of the magnetization is performed not by the rotation of the spin, but by the movement of the magnetic field. Since the magnetic field moves very slowly, a long period of time is required, even if it is tried to switch the magnetization by only HL by increasing HL. Therefore, in a memory device which is required to operate at a high speed, the aforedescribed regions are not utilized. In accordance with my invention, magnetic fields HL and HT are applied suitably as hereinbefore described, and the composite magnetic field P, available when HL and HT are applied coincidentally, is caused to extend to the exterior of the asteroid curve and the spin is rotated completely, that is, the magnetization is switched completely, whereby the readout is performed.

The method of applying the magnetic fields HL and HT, as hereinbefore described, is shown in FIGS. **2*a* and 2*b*. In FIGS. 2*a* and 2*b*, 1 designates the thin film element, 2 designates the drive wire for driving the magnetic field in the hard axis direction and 3** designates the drive wire for driving the magnetic field in the easy axis direction.

Figure 3:
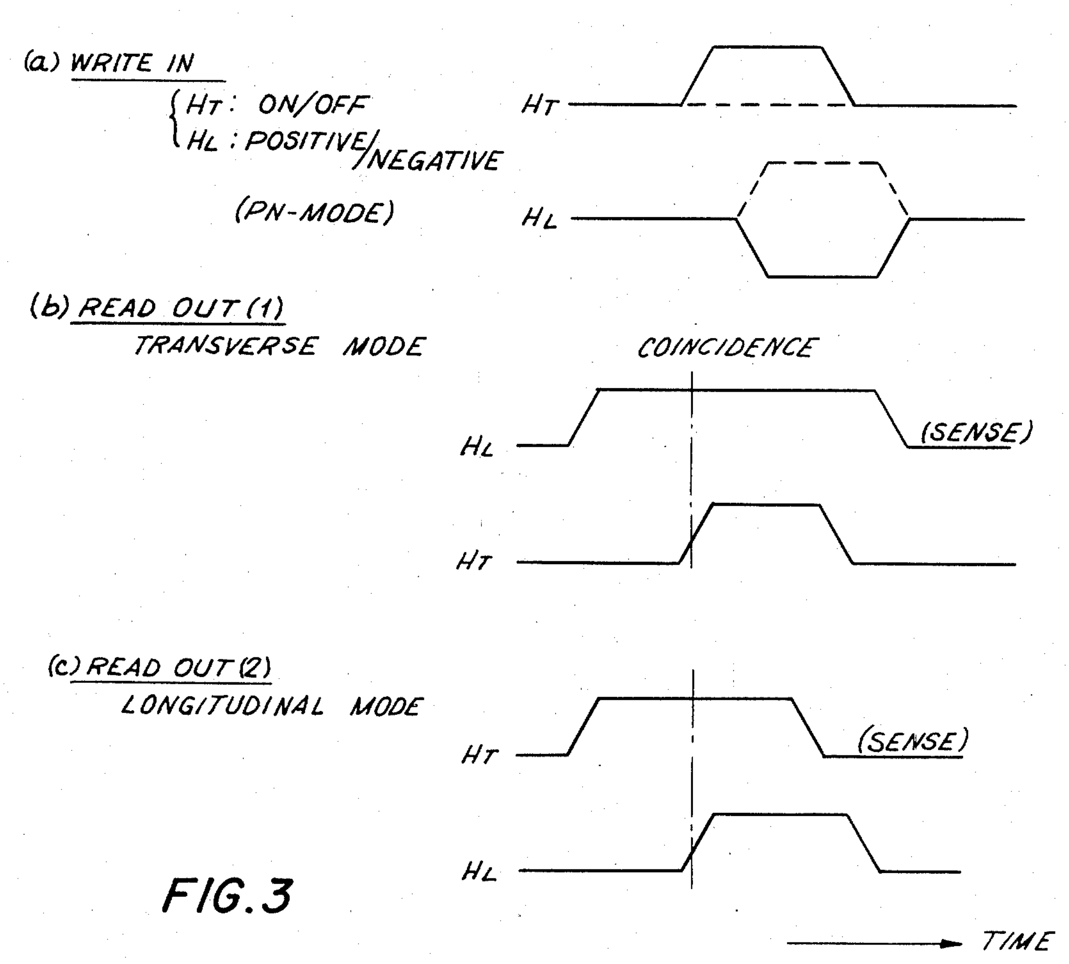
FIG. 3 is a graphical presentation of the driving waveforms suited for the memory device of the invention.

FIG. 3 shows the mode of the electric current supplied to the drive wire at the time of the readout and writein of the system of the invention. HT applies the magnetic field in the hard axis direction and is driven by the drive wire 2. HL applies the magnetic field in the easy axis direction and is driven by the drive wire 3. The curves *a* of FIG. 3 show the writein current waveform. The full line shows the writing in of one of the binary informations, for example "1," and the dotted line shows the writing in of the other binary information "0." Whether the electric current flows as shown by the full line, or as shown by the broken line, is determined by the writing in information. When the control is performed by the drive wire 2, the upper control current shown in the curves *a* flows and when the control is performed by the drive wire 3, the lower control current shown in the curves *a* flows.

Two types of readout modes are shown in the curves *b* and *c* of FIG. 3. In one of these modes, the drive is performed in the hard axis direction and the component of the change of the magnetic flux in the easy axis direction is sensed while, on the contrary, in the other mode, the drive is performed in the easy axis direction and the component of the change of the magnetic flux in the hard axis direction is sensed. The former mode is shown in the curves *b* of FIG. 3 and the latter mode is shown in the curves *c* of FIG. 3. In the former mode, the drive is performed in a direction at right angles with the easy axis direction so that said mode is referred to as the transverse mode or, T-Mode, while in the latter mode, the drive is performed in a direction parallel to the easy axis so that such mode is referred to as the longitudinal mode or L-Mode.

In the curves *b* and *c* of FIG. 3 the coincidence of the electric current is shifted. This is because it is supposed that it is also possible to utilize the drive wire as the sense wire, also, and such shifting is essentially unnecessary. Which of the two modes should be adopted is determined by the values of the drive current and the output voltage, the signal to noise ratio S/N, and the ease of the manufacture of the matrix. As hereinafter described, the practical embodiment of this invention adopts the operation of the T-Mode, but it is also possible to adopt the operation of the L-Mode or a slight modification of the operations of the two modes. FIG. 9 qualitatively shows the waveforms of the readout and writein, the movement of the spin and the output waveform in the practical embodiment of the invention. This is described hereinafter.

The method of constituting a memory device based on the principle of the invention and the method of erasing various noises is now described. For the sake of simplicity, however, the controlling of the electric current supplied to the conductor parallel to the hard axis, the magnetic field being in the easy axis direction, by the writing in information and using said drive conductor also as the sense wire, is described.

Figure 4:
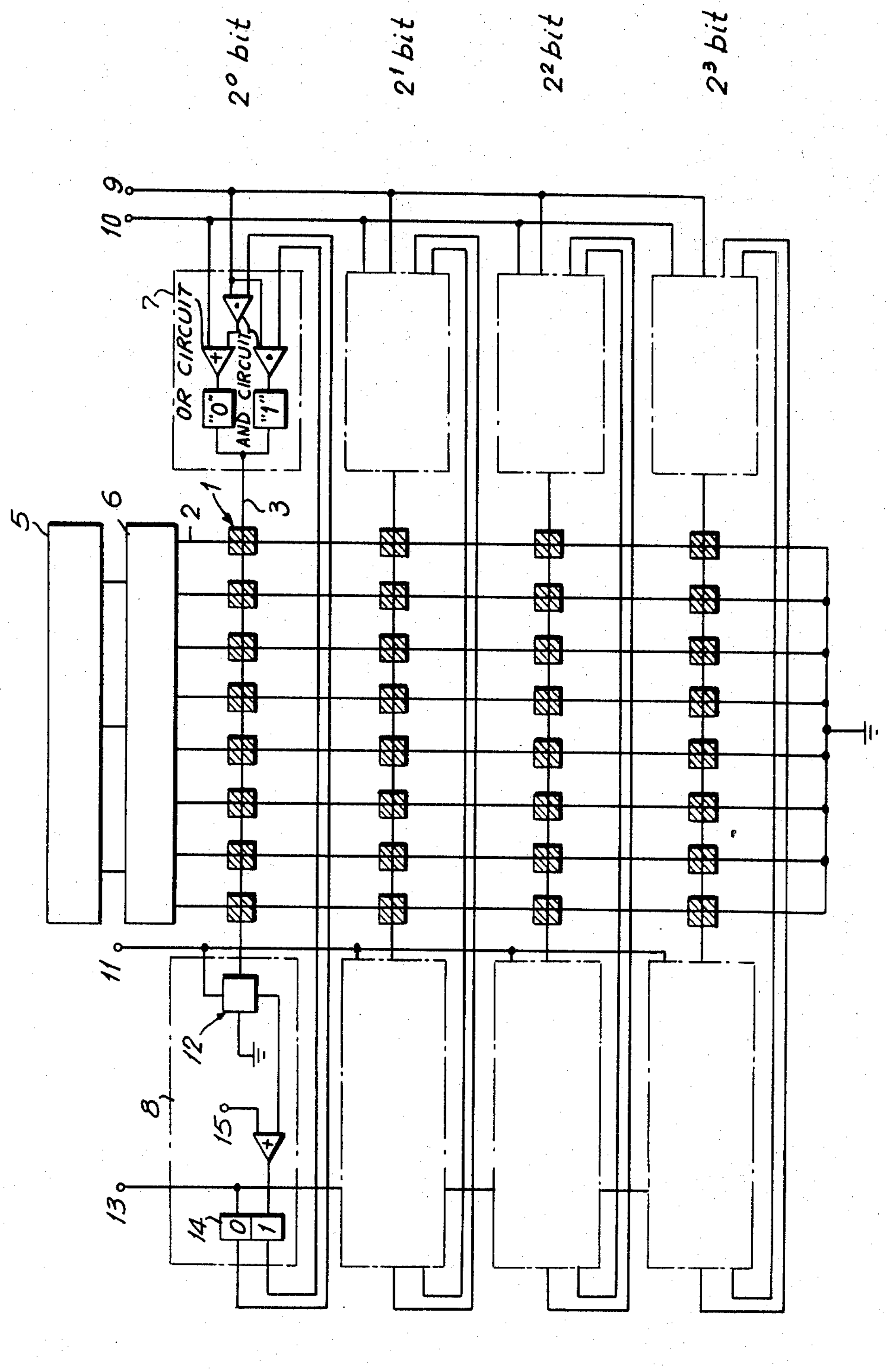
FIG. 4 shows an example of the most simplified device according to the invention illustrating the most basic principle of operation of the memory device of the invention wherein one word comprises four bits and there is no option of address in the direction of the bit.

FIG. 4 shows the memory device of the simplest embodiment of the memory selection system of the invention. In FIG. 4, 1 designates the thin film memory element, 2 designates the hard axis drive wire, 3 designates the easy axis drive wire, 5 designates the address register, 6 designates the address selecting drive matrix circuit, 7 designates the digit direction drive circuit, 8 designates the signal detecting circuit, 9 designates the writein timing pulse input wire, 10 designates the readout timing pulse input wire, 11 designates the strob pulse input wire, 12 designates the signal sensing and amplifying circuit, 13 designates the reset pulse input wire, 14 designates the information register, 15 designates the writingin information input wire, + designates an OR circuit, ● designates an AND circuit, "1" designates the drive circuit for writing in logic 1, and "0" designates the drive circuit for writing in logic 0.

The longitudinal direction of the drawing is the easy axis direction of the memory element. The hard axis drive conductors 2 and the easy axis drive conductors 3 are provided in such manner that the conductors 2 may indicate the number of addresses, and the conductors 3 may indicate the number of bits of one word when the driving current shown in FIG. 3 is used. Circuitry is included for erasing the driving current in each of the easy axis drive conductors 3 and detecting only the output signal of the element.

Figure 7:
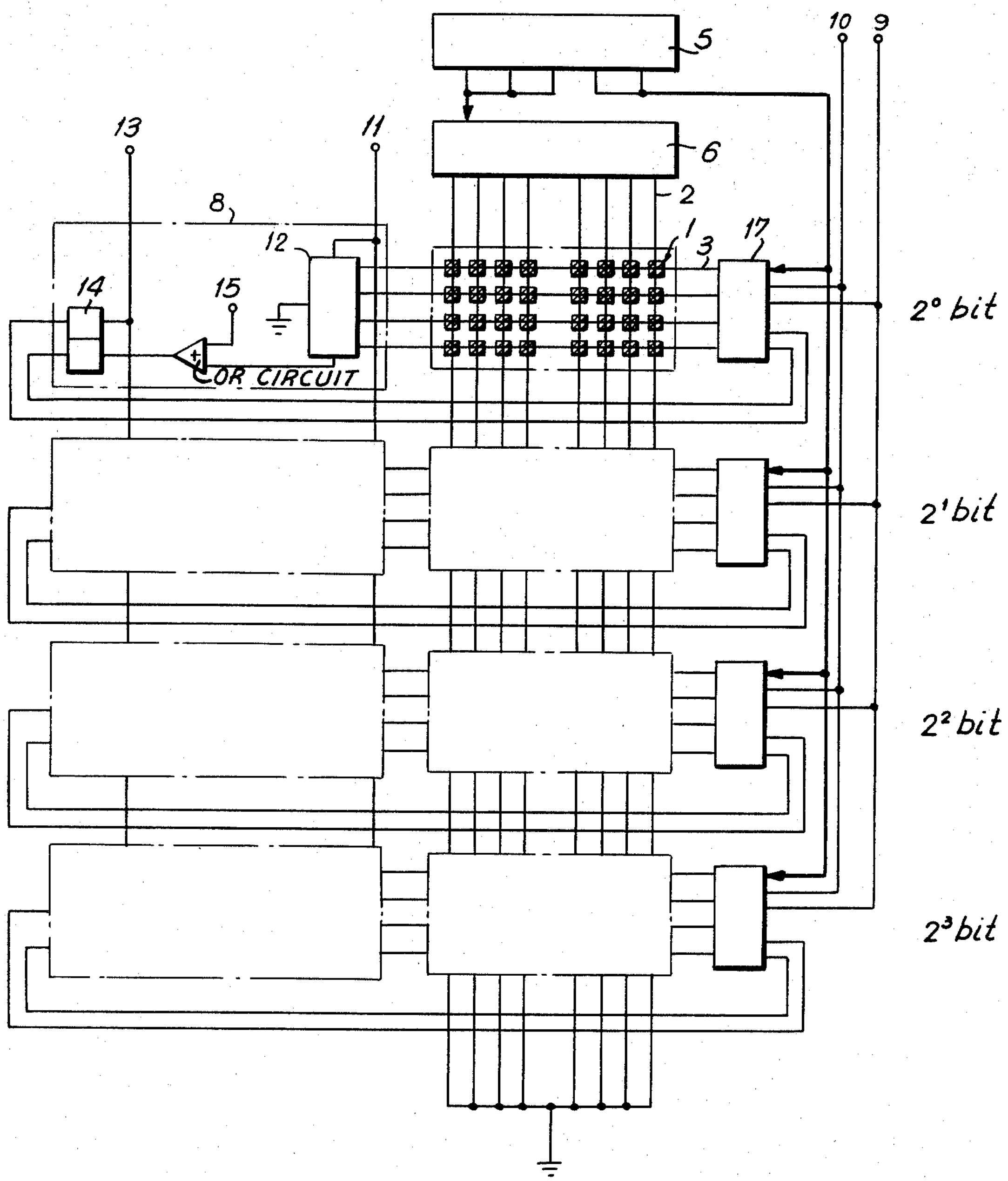
FIG. 7 shows an example of a device, including 32 words in all, each word comprising 4 bits, utilizing the bit shown in FIG. 5, all the parts of the device of the invention necessary for explaining its operation being clearly shown in the drawing, although the exterior connections of the device, such as the control processor and the control part or timing circuit, etc. are omitted.

Since each of the digit direction drive circuits 7 has no option of the address in the memory device, there is not much advantage from the viewpoint of the cost of the peripheral circuit. Therefore, the following structure is further considered. Two or more drive wires controlled by the writing in information are provided corresponding to each information bit constituting one word and each of these drive wires is driven selectively by the address information and the writing in information and the address is selected by the coincidence of the drive wire with the other drive wire. It is possible to sharply reduce the cost of the drive circuit by following the aforedescribed procedure. FIG. 7 shows an example of the device including 32 words, each word comprising 4 bits.

In FIGS. 4 and 7, like reference numerals refer to like parts. The only difference is that in FIG. 7, the easy axis drive circuit in the transverse direction or digit direction is also selected by the input address information. That is, the device of FIG. 7 has the digit direction address selecting drive matrix 17.

Figure 5:
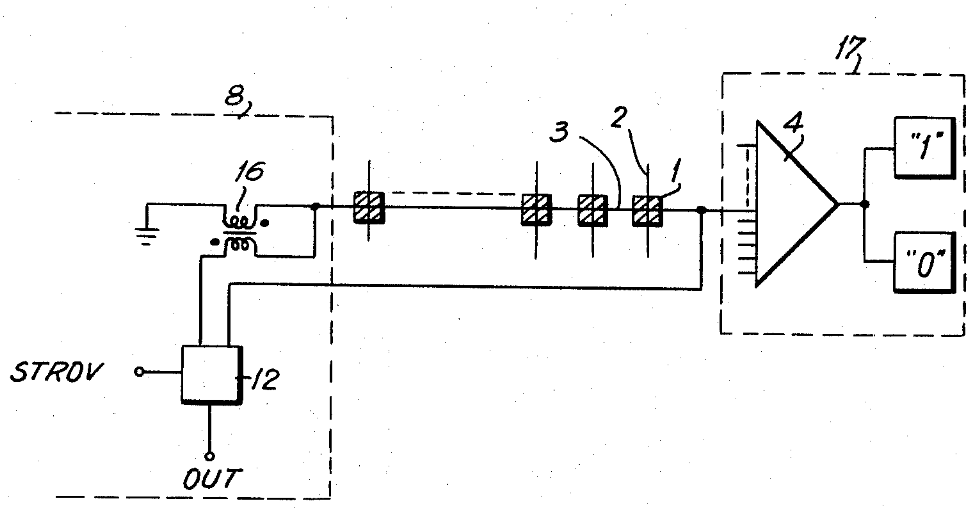
FIG. 5 shows only one bit in explanation of the method of increasing the capacity by giving the option of address to the direction of the bit also and in explanation of the sensing method.
Figure 6:
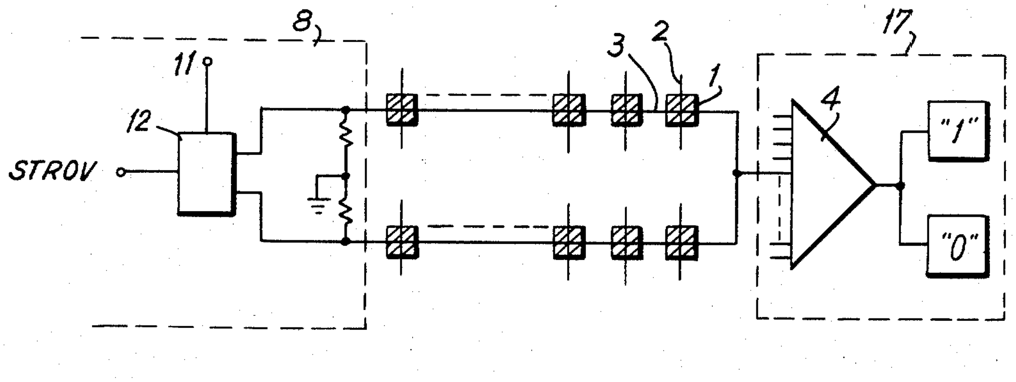
FIG. 6 shows only one bit in explaining the method of increasing the capacity by the same method as FIG. 5 and a sensing method different from that illustrated by FIG. 5.

FIGS. 5 and 6 show the constitution of the digit direction address selecting drive matrix 17 and a part of means 8 for detecting only the output signal from the element. In FIGS. 5 and 6, as in the other drawings hereinbefore described, 1 designates the element, 2 designates the hard axis conductor and 3 designates the easy axis conductor or digit wire. The address information is supplied from the exterior to the digit direction address selecting drive matrix 17 and is decoded by the decode circuit, which comprises a matrix, and one of the digit wires or easy axis conductors is determined. At such time, which of "1" or "0" is written in is determined by the "1" and "0" circuits shown in the drawing, depending upon whether the writing in information is "1" or "0" and electrical current flows under the control of such determination.

There are two types of arrangement 7 for erasing the driving current and detecting only the output signal of the element. The meaning of FIG. 5 and FIG. 6 is different, depending upon which of these types of arrangement is utilized. FIG. 5 shows the method applied when the conductor 3 is relatively short. In this case, the driving current is erased by the use of the differential transformer 16 and the differential amplifier 12. FIG. 6 shows the detecting means suitable when the conductor is long. In this case, the conductor 3 is divided into two equal parts and the driving current flows in parallel and is made the common code on the sensing side and the differential amplifier 12 and resistors are utilized. The latter detecting system is best suited for my invention, since the object of the invention is to realize a large capacity memory device and said detecting system is utilized in the practical embodiment of the invention which is hereinafter described.

FIGS. 9 to 15 show a practical embodiment of the invention. FIG. 9 qualitatively shows the driving waveforms of the readout and writein, the movement of the spin by the driving waveform and the detected output waveform. The movement of the spin is shown by the arrow marks in the circles. The full line is "1" and the broken line is "0." The detected output waveform or sense signal requires special attention. The detected output waveform is detected just when it leaves the differential amplifier. The strob is applied at the time of the readout, and only the inverted signal from the element is selected. This is illustrated by the strob of the timing of the final stage in FIG. 9.

As indicated by the sense signal waveform, a number of noise waveforms are generated, besides the sense signal R. Noise waveforms T1, T2 and T3 show the transient noises generated by the easy axis driving current which flows through the digit wire and it is inevitable that these noises should be generated more or less with as good a balance as the driving current which flows through the balancing sense wire itself is amplified. The noise current values produce large peaks, but since they occupy only a short period of time, they can be determined by the strob. Other wire waveforms H1, H2 and H3 show the half-selective driving current.

The noise problem is that, even in the sense system which is not selected, the half-selective noise is generated by only the magnetic field in the hard axis direction. The half-selective noise is described as follows. The B–H hysteresis curve in the hard axis direction of the ferromagnetic thin film having the uniaxial anisotropy, is shown in FIG. 8*a*. The B–H hysteresis curve in the easy axis direction is shown in FIG. 8*b*. As evident from this, the hard axis direction has no square loop characteristic, so that a considerable amount of semi-selective noise is generated by the half-selective driving current.

As shown in FIG. 9, however, the ratio with the signal output available when the magnetization is switched by the coincidence of the driving currents, that is, the signal to noise ratio S/N, is a value which may be satisfactorily put to a practical use. The easy axis direction shows the square loop characteristic and therefore only a sufficiently small noise output is generated and there is no problem at this point.

If the device is constituted as shown in FIG. 7, the half-selective noise is generated by the magnetic field in the hard axis direction in all of a group of driving wires constituting 1 bit, but the polarity is the same in all of these wires. Thus, if the circuit is constituted in such manner that in gathering these wires into 1 bit, half of them may have the inverse polarity, it becomes possible that only the difference between the semi-selective noises caused by each of uniformity in the characteristics of the elements should finally appear as the noise on the sensing side and a satisfactory signal to noise ratio may be obtained.

In the practical embodiment of the circuit of the invention shown in FIGS. 10 to 15, the aforementioned problematical point is solved by the make and break of the diodes. That is, the diodes pass all of the output signals from the elements of the selected digit wires to the output detecting circuit side but pass none of the signals from the digit wires which are not selected such as, for example, the signals generated based on the switching of a part of the elements or selective noises to the output detecting circuit side.

In FIG. 10, one of the diodes is representatively designated by numeral 100. In FIG. 10, there are 128 diodes 100. The diodes 100 are also shown in FIG. 11. Reference numeral 101 designates the thin film memory element, 102 designates the magnetic field driving wire in the hard axis direction, 103 designates the magnetic field driving wire in the easy axis direction, which is also referred to as the digit wire, 108 designates the means for detecting only the output signals from the elements, or the signal detecting circuit, 117*a* and 117*b* designate the digit direction address selecting drive matrix, and 118 designates the detecting circuit including the transformer for balancing the output signals from the digit wires and detecting all of them and supplying them to the circuit 108 for detecting only the output signals form the elements.

An address register 105 registers the address informations provided by the arithmetic circuit such as the computer. A selecting matrix circuit or decoder 106 selects one of the hard axis conductors via the address information. A conductor 120 supplies, in parallel, the address informations to the selecting matrix circuit in the hard axis direction. A conductor 121 supplies, in parallel, the address informations to the column selecting matrix circuit in the easy axis direction. A conductor 122 supplies, in parallel, the address informations to the line selecting matrix circuit in the easy axis direction.

The device of FIG. 10 comprises the 1st, 2nd, 3rd and 4th bits, shown from above in the drawing, and constitutes 64 words in all. In the disclosed embodiment, the device includes 64 words, or 4 bits per word, in all. The capacity of the actual large capacity memory device is 262,144 words, or 36 bits per word. That is, there are 262,144 memory positions times 36 = 9,437,184. A memory device of such capacity may be realized by the fundamental circuit of FIG. 10.

FIG. 11 shows the write in drive system not shown in FIG. 10. The 1st, 2nd, 3rd and 4th bits are designated by *a*, *b*, *c* and *d* respectively. The signal obtained from the sensing and detecting circuit 108 is supplied for the purpose of rewrite in via an input terminal 128. The memory information is supplied from the arithmetic device such as the computer, outside the device, via a lead in wire 131. That is, the wires 131 are connected to the write in bus of the computer. The two input wires 131 are connected to the register 130 via the OR circuit designated by the symbol +.

The register 130 comprises flip flops FF and operates as the buffer of the synchronizer between the outside and the memory. The register also stores the result read out from the memory. The information, after storage, in the flip flops, is transferred to the memory device by the timing signal, that is, the write in timing pulse which is operating the entire computer taking the synchronization at the same time. The write in timing pulse is supplied by a line 139. The pulse then causes the address selecting circuit 127*a* in the direction of the column in the direction of the digit to operate all at once through the AND circuit designated by the symbol●.

Since the address information is supplied to the address selecting circuit via the other line 121, the decode matrix is operated by the information and one of the conductors in the digit direction is determined. The same performance occurs in the address selecting circuit 127*b*. When the writein signal is "0," the aforedescribed operation is not performed and as a result, "0" remains written in the memory. The lines 132 supply the signals read out of the memory to the arithmetic circuit of the computer and are thus connected to the readout bus. Furthermore, the line 133 is the reset input terminal.

FIGS. 12 and 13 are not absolutely necessary for explaining the present embodiment of the invention, since they overlap the preceding description. However, FIGS. 12 and 13 show the embodiment from a different viewpoint, so that the invention may be better understood. The parts of the device shown in FIGS. 12 and 13 are symbolized in the same manner as in the preceding FIGS. RD designates the read driver circuit, WD designates the write driver circuit, RS designates the read select circuit and WS designates the write select circuit. Furthermore, 108 is the output signal detecting circuit, but the delay line D is used for the purpose of detection. A signal detecting circuit 112 includes the differential amplifier, the signal detecting circuit and the strob circuit.

FIG. 14 shows the actual wiring of the differential amplifier, the signal detecting circuit and the strob circuit. In FIG. 14, 37 designates the differential amplifier, 38 designates the signal detecting circuit, 39 designates the strob circuit and 41 designates the strob input terminal. The differential amplifier 37 is not different from the commonly used amplifier of this type. The signal detecting circuit 38 is the current switching type which is also publicly known and therefore such circuit requires no particular explanation. The strob circuit 39 will also be understood without any particular explanation. The output signal is provided at the OUT terminal 128.

The circuit which has the readout amplifier and the detecting circuit, that is, the digit direction 103, has been described. Thus, the method of selecting the easy axis magnetic field or drive wire Y and the method of reading it out and writing it in have been described the hard axis magnetic field drive wire or wire 102 circuit is described with regard to FIG. 15. FIG. 15 shows the selecting matrix circuit for selecting the hard axis drive wire X. A single drive wire 102 is selected by the use of the coincidence method using transformers provided in the direction of the column and in the direction of the line.

I claim:

1. A destructive thin film magnetic memory device having uniaxial anisotropy and a hard magnetization direction axis and an easy magnetization direction axis, said device comprising current driving conductors parallel to the hard magnetization direction axis and the easy magnetization direction axis of said memory device, said current driving conductors having a different direction axis characteristic and being positioned in a manner whereby they separately and selectively produce a magnetic field parallel to said hard magnetization direction axis and a magnetic field parallel to said easy magnetization direction axis, one of said current driving conductors serving as an output conductor;

current supply means for supplying to said current driving conductors driving currents for flowing through each of said conductors and selected to prevent inversion of the magnetization by a flow of driving current in either of said current driving conductors and to permit inversion of the magnetization only by a flow of driving current simultaneously in both said current driving conductors, one of said driving currents being dependent upon writein information and the other of said driving currents being independent of writein information whereby readout is provided by a flow of driving current simultaneously in both said current driving conductors and writein is provided by a flow of driving current independent of said writein information in one of said current driving conductors and a flow of driving current dependent upon said writein information in the other of said current driving conductors; and detecting means for supplying driving currents to the current driving conductors, said detecting means utilizing one of said conductors as a readout conductor to erase a readout drive current in the current driving conductor commonly utilized as the readout conductor, thereby detecting only a readout signal.

2. A destructive thin film magnetic memory device as claimed in claim 1, wherein a plurality of current driving conductors are provided in the hard magnetization direction axis and are divided into two groups and a plurality of current driving conductors are provided in the easy magnetization direction axis and are divided into two groups.

3. A destructive thin film magnetic memory device as claimed in claim 1, further comprising a plurality of memory units each having at least two current driving conductors and wherein the current supply means supplies to said conductors driving currents corresponding to writein information of the driving currents supplied to the current driving conductors parallel to the hard magnetization direction axis and the easy magnetization direction axis, thereby selecting one current driving conductor of each of said memory units for conducting a driving current corresponding to said writein information and address selection information and simultaneously selecting another current driving conductor for conducting a driving current independent of said writein information thereby providing address selection.

4. A destructive thin film magnetic memory device as claimed in claim 3, wherein a plurality of current driving conductors are provided in the hard magnetization direction axis of each of said thin film magnetic memory devices and are divided into two groups and a plurality of current driving conductors are provided in the easy magnetization direction axis of each of said thin film magnetic memory devices and are divided into two groups.

5. A destructive thin film magnetic memory device as claimed in claim 3, further comprising address information means for selectively providing address information current to the current driving conductors in the easy magnetization direction axis of said thin film magnetic memory devices, writein information current being supplied to said current driving conductors whereby those thin film magnetic memory devices supplied with current in their current driving conductors in the hard magnetization direction axis are switched.

* * * * *